United States Patent
Iwata

(10) Patent No.: US 7,334,116 B2
(45) Date of Patent: Feb. 19, 2008

(54) BIT MANIPULATION ON DATA IN A BITSTREAM THAT IS STORED IN A MEMORY HAVING AN ADDRESS BOUNDARY LENGTH

(75) Inventor: Eiji Iwata, Kanagawa (JP)

(73) Assignee: Sony Computer Entertainment Inc. (JP)

( * ) Notice: Subject to any disclaimer, the term of this patent is extended or adjusted under 35 U.S.C. 154(b) by 213 days.

(21) Appl. No.: 10/959,613

(22) Filed: Oct. 6, 2004

(65) Prior Publication Data

US 2006/0101246 A1    May 11, 2006

(51) Int. Cl.
*G06F 9/305*  (2006.01)

(52) U.S. Cl. ...................................... 712/300

(58) Field of Classification Search ............... 712/204, 712/300
See application file for complete search history.

(56) References Cited

U.S. PATENT DOCUMENTS

| | | |
|---|---|---|
| 3,793,631 A | 2/1974 | Silverstein et al. |
| 4,095,265 A | 6/1978 | Vrba |
| 4,408,275 A | 10/1983 | Kubo et al. |
| 4,449,184 A | 5/1984 | Pohlman, III et al. |
| 4,970,642 A | 11/1990 | Yamamura |
| 5,265,204 A | 11/1993 | Kimura et al. |
| 5,550,972 A | 8/1996 | Patrick et al. |
| 5,608,887 A | 3/1997 | Dinkjian et al. |
| 5,696,946 A | 12/1997 | Patrick et al. |
| 5,696,959 A | 12/1997 | Guttag et al. |
| 5,812,147 A | 9/1998 | Van Hook et al. |
| 5,821,886 A | 10/1998 | Son |
| 5,826,074 A | 10/1998 | Blomgren |
| 5,835,793 A | 11/1998 | Li et al. |
| 5,835,973 A | 11/1998 | Kyuma et al. |
| 5,865,914 A | 2/1999 | Karabin et al. |
| 6,122,724 A | 9/2000 | Kawasaki et al. |
| 6,195,741 B1 | 2/2001 | Asato |
| 6,216,218 B1 | 4/2001 | Sollars |
| 6,247,112 B1 | 6/2001 | Seki |
| 6,272,620 B1 | 8/2001 | Kawasaki et al. |
| 6,332,188 B1 | 12/2001 | Garde et al. |
| 6,437,790 B1 | 8/2002 | Kimura et al. |
| 6,539,059 B1 | 3/2003 | Sriram et al. |
| 6,546,053 B1 | 4/2003 | Ishii |
| 6,552,730 B1 | 4/2003 | Kimura et al. |
| 6,560,694 B1 | 5/2003 | McGrath et al. |

(Continued)

FOREIGN PATENT DOCUMENTS

WO    WO-01/98892    12/2001

OTHER PUBLICATIONS

Andrew S. Tanenbaum, Structured Computer Organization, Prentice-Hall, Inc, 1984, pp. 10-12.*

*Primary Examiner*—Richard L. Ellis
(74) *Attorney, Agent, or Firm*—Lerner, David, Littenberg, Krumholz & Mentlik, LLP

(57) ABSTRACT

A bit manipulation processor, system and method are provided which reduces the number of operations performed during data processing. An additional register is used as a buffer. The buffer has a bit length which is preferably greater than the address boundaries in a memory or register address. A bitstream can be processed using the buffer by itself or in combination with a standard register, depending upon the particular function to be implemented.

23 Claims, 16 Drawing Sheets

U.S. PATENT DOCUMENTS

| | | |
|---|---|---|
| 6,571,330 B1 | 5/2003 | McGrath et al. |
| 6,587,058 B1 | 7/2003 | Deeley et al. |
| 6,658,578 B1 | 12/2003 | Laurenti et al. |
| 6,671,428 B1 | 12/2003 | Yang et al. |
| 6,671,791 B1 | 12/2003 | McGrath |
| 2001/0047456 A1 | 11/2001 | Schrobenhauzer et al. |
| 2001/0050682 A1 | 12/2001 | Deering et al. |
| 2002/0025003 A1 | 2/2002 | Kyoung |
| 2002/0050992 A1 | 5/2002 | Deering |
| 2002/0066007 A1 | 5/2002 | Wise et al. |
| 2003/0043156 A1 | 3/2003 | Macy et al. |
| 2003/0210163 A1 | 11/2003 | Yang |

\* cited by examiner

Conventional Method for Delete_Bits(N)

(2) Delete_Bits(N) (0 < N <= 32)

1 Operation (1 arithmetic)

Conventional Method for Get_Bits(N)

(3) Get_Bits(N) (0 < N <= 32)

Get_Bits(N) operates Show_Bits(N) and Delete_Bits(N) together 9 or 14 Operations

Get_Bits(N) with Bitstream Buffer Register (1)

(2) Get_Bits(N)

(a) RestBits > 32 + N

7 Operations (3 arithmetic, 1 compare, 2 shift, 1 branch)

BIT MANIPULATION ON DATA IN A BITSTREAM THAT IS STORED IN A MEMORY HAVING AN ADDRESS BOUNDARY LENGTH

BACKGROUND OF THE INVENTION

Bit manipulation is the process of altering or manipulating bits in memory, and typically consists of the following activities: clearing bits, testing bits, comparing bits, inverting bits, inserting bits into a bit string and extracting bits from a bit string. From some of the earliest microprocessor days, AND, OR, EOR, NOT, TEST and SHIFT and ROTATE instructions were primarily relied upon to manipulate bits of data.

In conventional systems, a general purpose computer may spend a significant portion of available processing resources in order to handle variable length data streams in coding and decoding algorithms. The computer loads the variable length bitstream directly from memory (which acts as a bitstream buffer) into a register and then performs various procedures on the data, such as deleting bits, getting bits and showing bits. Interactions between the register and the memory can require a significant number of operations, depending upon the size of the register. For example, performing a "show_bits" function, denoted only herein as the name "show_bits" for ease of understanding its function, which functions to locate the bits of interest in proper alignment in a register using a conventional 32-bit register can require a significant number of operations (e.g., eight operations) if the data of interest does not exceed 32 bits and does not cross a 32-bit boundary in the memory, or even more operations (e.g., 13 operations) if the data of interest does cross the 32-bit boundary. Of course, the number of instructions and the bit boundary may change depending on the instruction set architecture of the processor.

For instance, FIG. 1 illustrates a diagram of a conventional method of showing N bits ("Show_Bits(N)"). Show_Bits(N) provides an integer number, N, of bits in a register. For instance, bitstream data is loaded into memory, such as system memory, and the Show_Bits(N) method places or loads a predetermined number of bitstream bits, N, in a register. Each register and memory location may be addressed with a 32 bit address and two conditions must be accounted for with the Show_bits command: the case where the N bits requested cross a 32-bit boundary in system memory and the case where the N bits requested do not cross a 32-bit boundary in system memory. The bit size of the actual memory locations can vary and can be addressed virtually. In general, a register is distinguished from system memory in that a register is memory which has a specific address which is used to hold information of a specific kind. The bitstream pointer points to a specific memory address in which bitstream data is stored. The bitstream data can arrive asynchronously and can be of variable length.

For example, it may be desired to show a byte of memory from the $70^{th}$ through the $77^{th}$ bit locations, a 32-bit boundary occurs at the $95^{th}$ and $63^{rd}$ bit (starting bit position occupying the $0^{th}$ bit position). This represents an instance where N bits does not cross the 32-bit boundary. In a conventional Show_bits method, after determining that the N bits does not cross the 32 bit boundary, the contents of the memory location addressed by the bitstream pointer containing the N bits is loaded into a 32-bit register. M represents the number of bits from the $N^{th}$ bit to the next memory address boundary. For the case where the byte of memory represented by the $70^{th}$ through $77^{th}$ bit locations is desired to be shown, M is 18, the difference from the next boundary, the $95^{th}$ bit location to the $N^{th}$ bit or rather $77^{th}$ bit. Next, the contents of the 32-bit register is logically left shifted by M bits. This ensures that that portion of the register containing the most significant bits are occupied by the N bits to be shown. For this example, N is 8. This is followed by a logical right shift of the contents of the 32 bit register by 32–N bits, or rather 24 bits for this example. All but the relevant N bit portion of the bitstream now remains in the 32 bit register, right-aligned with all non-relevant bitstream data having been shifted out of the 32-bit register. This conventional Show_Bits method thus typically requires at least 8 operations: 3 arithmetic (M+N, the bit difference between the bit position of the most significant bit position of the bitstream and the 32-bit boundary, and 32–N); 1 compare (with 32); 2 shift; 1 load; and 1 branch to the appropriate Show_Bits(N) routine (based off of the results of the compare).

FIG. 2 is a diagram which illustrates another conventional method of a Show_Bits(N) method where the N bits of bitstream data to be shown crosses a 32-bit boundary in memory and/or is greater than 32 bits. Should, for instance, it be desired to show a byte of memory from the $90^{th}$ through the $97^{th}$ bit locations, a 32-bit boundaries occur at the $127^{th}$, $95^{th}$ and $63^{rd}$ bit (starting bit position occupying the $0^{th}$ bit position). This represents an instance where N bits crosses a 32-bit boundary. The conventional method loads the desired N bits, which, in this example, occupy two memory locations, into to 32-bit registers. That portion of the N bits which lies in the register with the most significant bit portion is logically shifted to the left by M bits. M being the number of bit positions to the 32-bit boundary of the next memory location. In this instance, M is 30, the difference between the boundary at bit position 127 and the most significant bit position in the N bit portion at bit position 97. That portion of the N bits which lies in the register with the least significant bit portion is logically right shifted by 64–M–N bits. Next, the register with the most significant bit portion of the N bits is logically right shifted by 32–N bits and the resultant registers are logically summed, such as performing a logical OR operation. The resultant value, stored in one of the registers holds the bits desired to be shown. This procedure requires at least 13 operations: 5 arithmetic (M+N, the difference of the Bitstream pointer bit position and the 32-bit boundary, 32–N, 64–M, and (64–M)–N); 1 logical OR; 1 compare with greater than 32; 3 shift; 2 load; and 1 branch to the appropriate Show_Bits(N) routine after determining the compare result.

FIG. 3 is a diagram which illustrates a conventional method of deleting bits ("Delete_Bits(N)") for deleting N data bits from the bitstream. The bitstream pointer is merely moved forward by N bits. By advancing the bitstream pointer by assigning it a value of the bitstream pointer plus N, those N bits are no longer being addressed. Delete bits requires only one arithmetic operation; namely, bitstream pointer+N.

FIG. 4 is a diagram illustrating a conventional method of getting bits from memory ("Get Bits(N)", which combines a conventional Delete_Bits(N) with a conventional Show_Bits(N) method. Consequently, N bits will be placed and right-aligned in a 32-bit register and the bitstream pointer will be advanced to the next N address. This operation requires either a minimum of 9 or 14 operations depending upon the Show_Bits(N) operation required.

FIG. 5 is a diagram which illustrates a conventional method to place or store N bits (i.e., "Put_Bits(N)"), in memory such as system memory. Two conditions must be evaluated first; namely, whether the N bit portion to be placed in memory will cross a 32-bit boundary in memory or whether it will not cross a 32-bit boundary in memory. The diagram of FIG. 5 illustrates an example where N bits are desired to be placed at the location pointed to by the bitstream pointer in memory. As shown, M bits exist from the end of a 32-bit boundary in memory to the beginning of the memory location addressed by the bitstream pointer at which the N bits is desired to be stored. For the case where the total of M bits plus N bits is less than or equal to 32, the contents of the memory bound by the 32-bit boundary is loaded into a 32-bit register. This 32-bit register is logically right shifted by 32−M bits, thereby right-aligning the M bits. Next, the M bits are logically left shifted by 32−M bits, thereby left-aligning the M bits. The N bits to be placed into memory are then taken from a right-aligned 32-bit register. The register containing the N bits is then logically left shifted by 32−M−N bits. Next the two 32-bit registers are logically summed (e.g., logically OR'ed) together and the result, including the N bits is stored in memory. This method requires at least 12 operations: namely, 4 arithmetic (such as M+N; the bit difference between the 32 bit boundary and the bitstream pointer); 1 compare; 1 logic OR 3 shift, 1 load, 1 store, and 1 branch to the appropriate Put_Bits routine.

FIG. 6 is a diagram illustrating another conventional Put_Bits(N) method for the case where the N-bit portion does cross the 32-bit boundary on memory. M bits from the 32-bit boundary to the bitstream pointer together with the remaining contents of the 32 bit boundary crossing in memory is loaded into a 32-bit register. The 32-bit register is logically right shifted by 32−M bits. Next, the register contents are logically left shifted by 32−M bits. This serves to left-align the M bit contents with zeros placed in the remaining register bit locations. A register holding the N bits to be placed in memory is logically right shifted by 64−M−N bits. However, the shift is accomplished with yet another register which is loaded with the overflow past a 32-bit boundary. This register is logically right-shifted again by M+N−32 bits. The contents of the register holding the shifted overflow, the register holding the left-shifted M bits and the register originally holding the N bits are logically summed (e.g., logically OR'ed) together and the result is stored in memory. This resulting N bits being placed in memory starting at the memory location pointed to by the bitstream pointer next to the M bits in memory. This requires a minimum of 17 operations: 6 arithmetic (which include calculating the difference between the bitstream pointer location and the 32 bit boundary, 32−M, 64−M, (64−M)−N, M+N and (M+N)−32); 1 compare with greater than 32; 1 logical OR; 3 shifts; 3 loads; 2 stores; and 1 branch to the appropriate Put_Bits(N) routine.

Given the conventional methods of bit manipulation examples of which are described above, there exists a need for improved methods and systems for fast bit manipulation that are more efficient and decrease the number of necessary bit manipulation operations.

SUMMARY OF THE INVENTION

The present invention provides apparatus and methods for performing bit manipulation of data in a bitstream. In accordance with one aspect of the present invention, a method of performing bit manipulation on data in a bitstream that is stored in a memory having an address boundary length is provided. The method comprises transferring data in the bitstream from the memory into a buffer, the buffer having a bit length greater than the address boundary length of the memory; and manipulating the bitstream data while it is stored in the buffer.

Preferably, the manipulating of the bitstream data aligns the bits of interest to be shown in a register in a predetermined alignment. Further, the manipulating of the bitstream data may include logically right shifting the bitstream data stored in the buffer by a number of bits equal to the difference between the bit length of the buffer and the number of bits to be shown.

In accordance with another aspect of the present invention, the manipulating of the bitstream data locates a number of valid bits to get in a predetermined alignment in the buffer. Preferably, when the number of valid bits in the buffer is greater than the bit length of the register plus the number of bits to get, and the manipulating of the bitstream data includes logically right-shifting the bitstream data stored in the buffer by the bit length of the buffer minus the number of bits to get; and logically shifting a bitstream pointer to a new address past an address including the number of bits to get.

Further, when the number of valid bits in the bitstream is less than or equal to a register address bit length plus the number of bits to get, the manipulating of the bitstream data includes loading the contents of the memory containing the bits to get into the buffer and a register, the buffer and the register having a bit length greater than the memory address bit length; logically left-shifting the data stored in the buffer by M bits, wherein M is the number of bits between the buffer boundary and the most significant bit of the address pointed to by a bitstream pointer; logically right-shifting the contents of the register by the difference of the buffer bit length and M; and subjecting the contents of the buffer and the registers to a logical sum; storing the results of the logical sum in the buffer; logically right-shifting the buffer by the bit capacity of the buffer minus the number of bits to get; and shifting the bitstream pointer past the address holding the number of bits to get.

Another aspect of the present invention provides that the manipulating of the bitstream data stores the bitstream data into a register prior to putting the bitstream data into the buffer. Preferably, when a number of invalid bits in the buffer is greater than the number of bits to be put into the buffer, the manipulating of the bitstream data includes placing the number of bits to be put into the buffer into a register; logically left-shifting the data stored in the register by the number of invalid bits in the buffer minus the number of bits to be put in the buffer; and subjecting the buffer to a logical sum operation with the register; and storing the result of the logical sum operation in the buffer.

In addition, when a number of invalid bits in the buffer is less than or equal to the number of bits to be put into the buffer, the manipulating of the bitstream data includes: storing a first part of bits to be put into the buffer into a first register; logically right shifting the data stored in the first register by the number of bits to be placed in the buffer minus the number of invalid bits in the buffer; logically summing the contents of the first register with the buffer and putting the results into memory; storing a second part of bits to be put into the buffer into a second register; logically left shifting the data stored in the second register by the bit length of the buffer minus the number of bits to put into the buffer plus the number of invalid bits in the buffer; and storing the contents of the second register into the buffer.

In another aspect of the present invention, the manipulating of the bitstream data deletes bits from the buffer. Preferably, when the number of valid bits in the bitstream is greater than the bit length of a register address plus the number of bits to be deleted, the manipulating of the bitstream data includes logically left shifting the data stored in the buffer by the number of bits to be deleted. Further preferred is when the number of valid bits in the bitstream is less than or equal to the bit length of a register address plus the number of bits to be deleted, the manipulating of the bitstream data includes: loading the contents of memory including the bits to be deleted into a first and a second register, the first and the second register having a bit length greater than the memory address bit length; logically left-shifting the first register by M bits, M being the number of bits between the buffer boundary and the most significant bit of the address pointed to by the bitstream pointer; logically right-shifting the second register by the difference of the buffer bit capacity and M; subjecting the contents of the first and second registers to a logical sum; and storing the result of the logical sum in the buffer.

In another aspect of the present invention, a processor is provided for performing bit manipulation on data in a bitstream that is stored in a memory having an address boundary length, wherein the processor being programmed for: transferring data in the bitstream from the memory into a buffer, the buffer having a bit length greater than the address boundary length of the memory; and manipulating the bitstream data while it is stored in the buffer.

Preferably, the manipulating of the bitstream data aligns the bits of interest to be shown in a register in a predetermined alignment. The processor may also manipulate of the bitstream data locates a number of valid bits to get in a predetermined alignment in the buffer. Further, the processor may store the bitstream data into a register prior to putting the bitstream data into the buffer. The processor may also delete bits from the buffer.

Other aspects of the present invention provide for a storage medium operable to store instructions for causing a processor to perform bit manipulation on data in a bitstream that is stored in a memory having an address boundary length, the instructions causing the processor to: transfer data in the bitstream from the memory into a buffer, the buffer having a bit length greater than the address boundary length of the memory; and manipulate the bitstream data while it is stored in the buffer.

Still another aspect of the present invention provides a system for performing bit manipulation on data in a bitstream, comprising: a memory storing data in a bitstream and having an address boundary length; and a processor comprising a buffer having a bit length greater than the address boundary length of the memory, said processor being programmed for transferring data in the bitstream from the memory into a buffer, the buffer having a bit length greater than the address boundary length of the memory, and manipulating the bitstream data while it is stored in the buffer. The memory and processor may be integrated on a single chip or separately provided.

Another aspect of the present invention provides a computer processing system for performing bit manipulation on data in a bitstream, comprising: a user input device; a display interface for attachment of a display device; a memory storing data in a bitstream and having an address boundary length; and a processor comprising one or more processing elements, at least one of the processor elements comprising a buffer having a bit length greater than the address boundary length of the memory, said processor being programmed for transferring data in the bitstream from the memory into a buffer, the buffer having a bit length greater than the address boundary length of the memory; and manipulating the bitstream data while it is stored in the buffer.

Yet another aspect of the present invention provides a computer network for performing bit manipulation on data in a bitstream, comprising: a plurality of computer processing systems connected to one another via a communications network, each of the computers comprising a user input device; a display interface for attachment of a display device; a memory storing data in a bitstream and having an address boundary length; and a processor comprising one or more processing elements, at least one of the processor elements comprising a buffer having a bit length greater than the address boundary length of the memory, said processor being programmed for transferring data in the bitstream from the memory into a buffer, the buffer having a bit length greater than the address boundary length of the memory; and manipulating the bitstream data while it is stored in the buffer.

In accordance with another aspect of the present invention, the bit manipulation steps can be performed on a wide range of processing systems. By way of example, a multi-processing system can be used.

DETAILED DESCRIPTION

Bit manipulation in accordance with the invention provides enhanced bitstream processing for variable length encoding and decoding. In order to reduce the number of operations performed during data processing, a fast bit manipulation scheme has been developed. For instance, the Show_Bits(N) function described above can be performed, according to the invention to be described, in two operations whether or not the data of interest exceeds a memory boundary.

In the present invention, an additional register is employed as the buffer for the bitstream. Upon initialization, the bitstream of interest is loaded into the buffer register and the number of valid bits in the bitstream (referred to herein as "RestBits") is recorded for later use. Preferably, the buffer register is at least 33 bits, although there is no maximum length. The bitstream may be processed using the buffer by itself or in combination with the standard register, depending upon the particular function required. The RestBits value is used and updated when performing, e.g., logical shifts. The architecture and methodology of the present invention is also applicable to other bit manipulation functions, such as the described Delete_Bits(N) function, the Get_Bits(N) function and the Put_Bits(N) function, and substantial improvements in speed are obtained when performing these functions with the present invention.

It should of course be understood that the reference herein to specifically-named functions such as Get_Bits, Put_Bits, Delete_Bits, etc. are only for ease of understanding of the present invention and are not necessarily well-known or industry terms. Their use herein should not be construed as limiting the present invention such as by limiting the present invention for use only with functions having these exemplary names.

Figure 1:
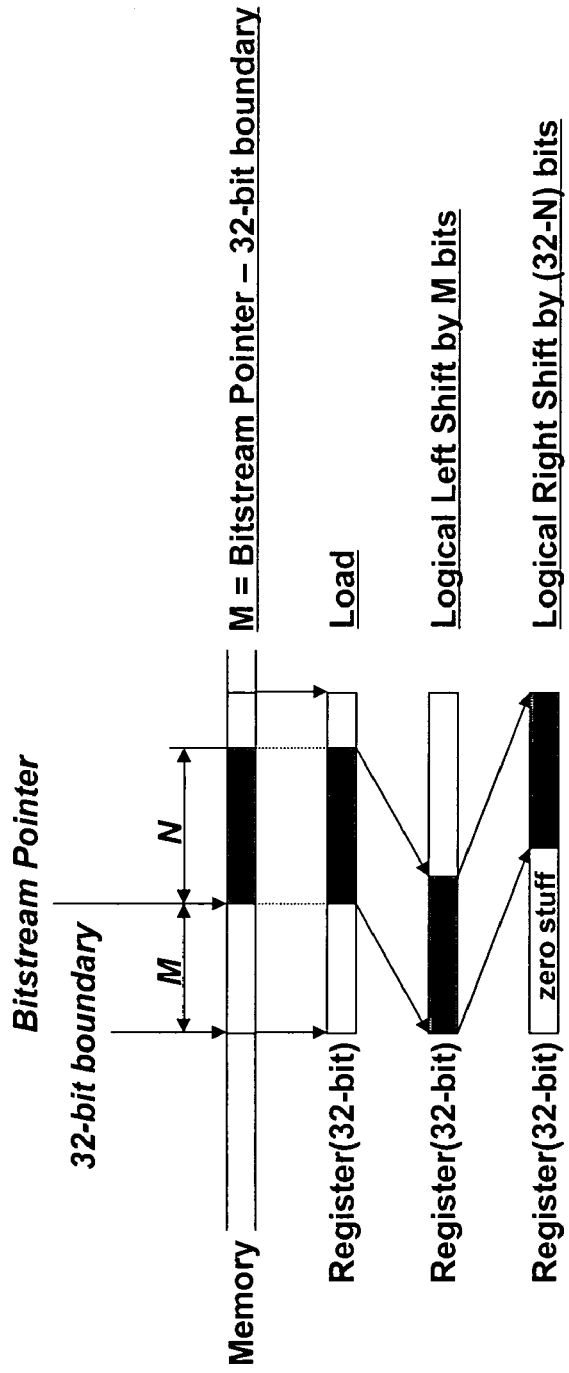
FIG. 1 illustrates a conventional bit manipulation function.
Figure 2:
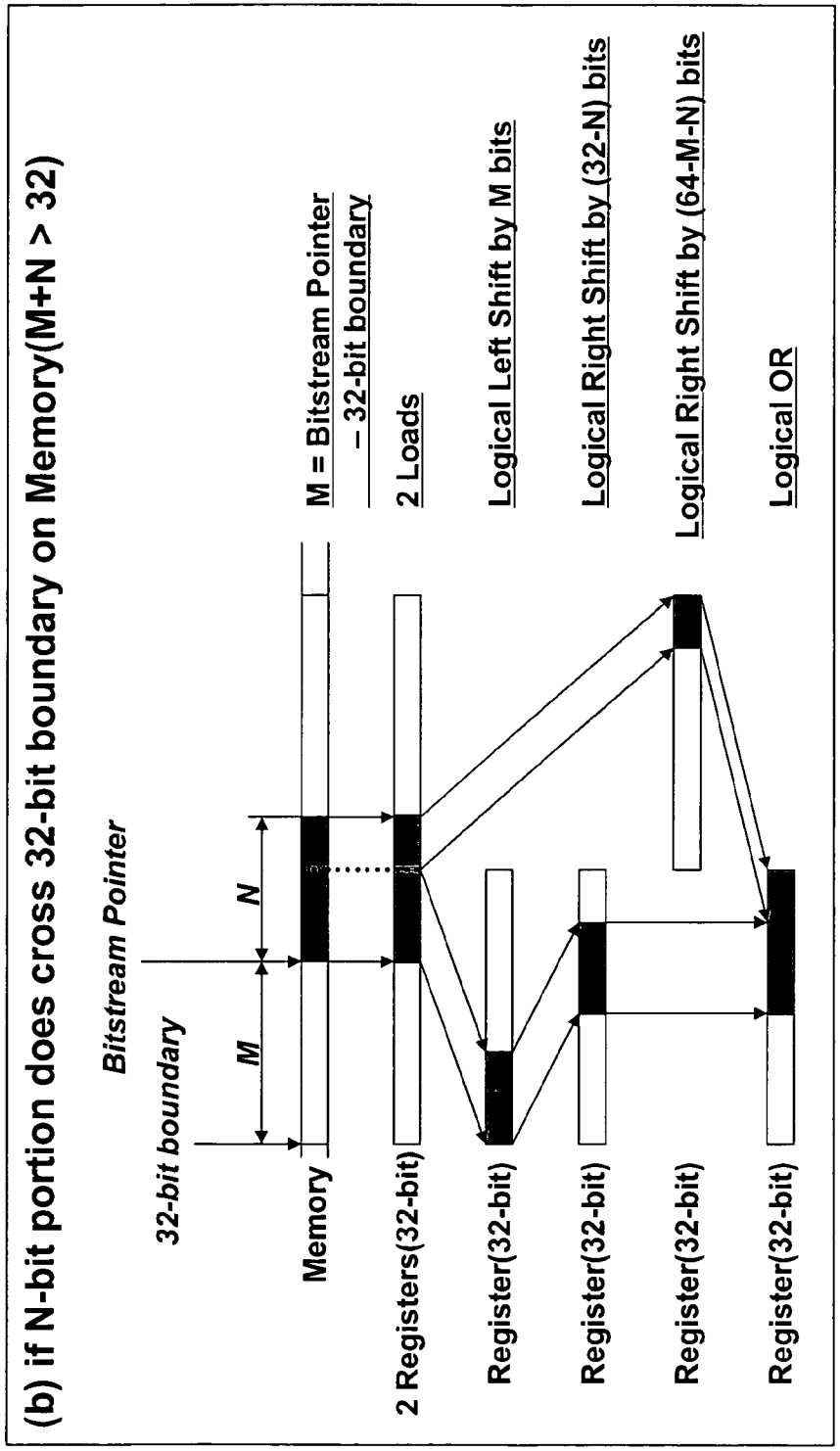
FIG. 2 illustrates a conventional bit manipulation function where the N bits of bitstream data cross a 32-bit boundary in memory and/or is greater than 32 bits.
Figure 3:
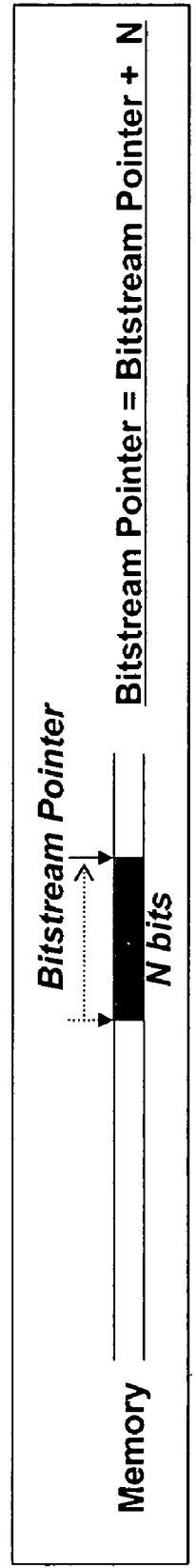
FIG. 3 illustrates a conventional bit manipulation function for deleting N data bits from the bitstream.
Figure 4:
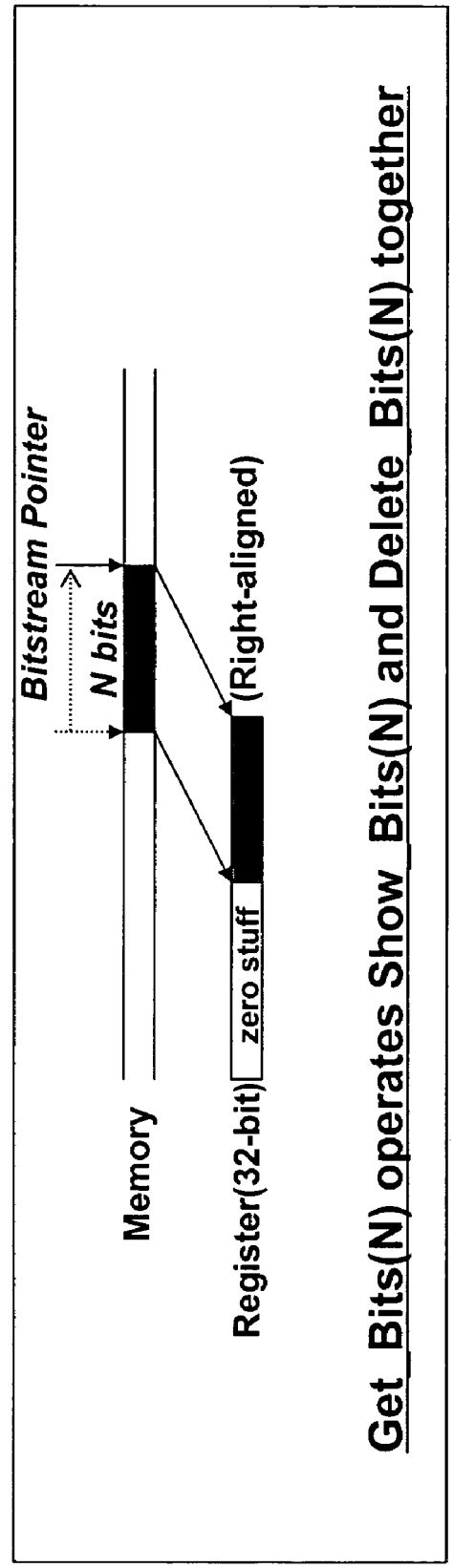
FIG. 4 illustrates a conventional bit manipulation function.
Figure 5:
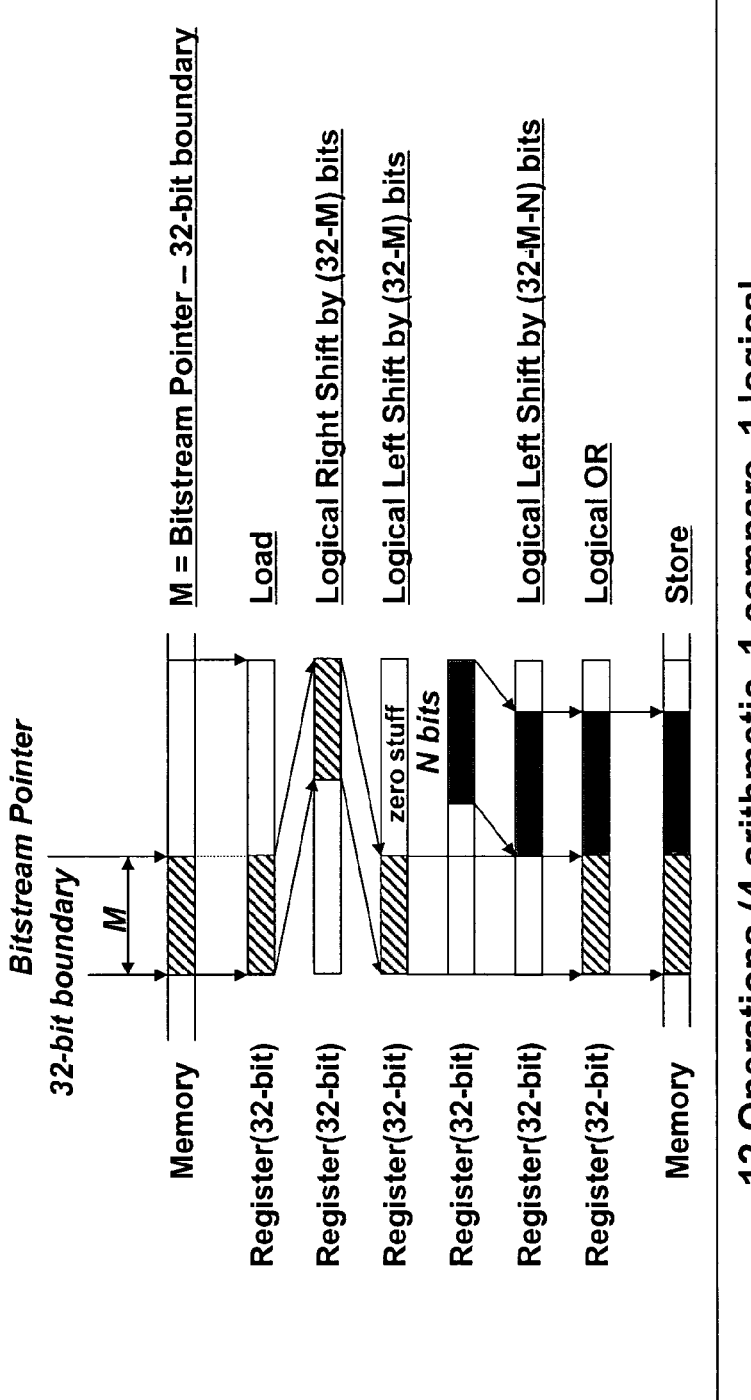
FIG. 5 illustrates a conventional bit manipulation function to place or store N bits in memory.
Figure 6:
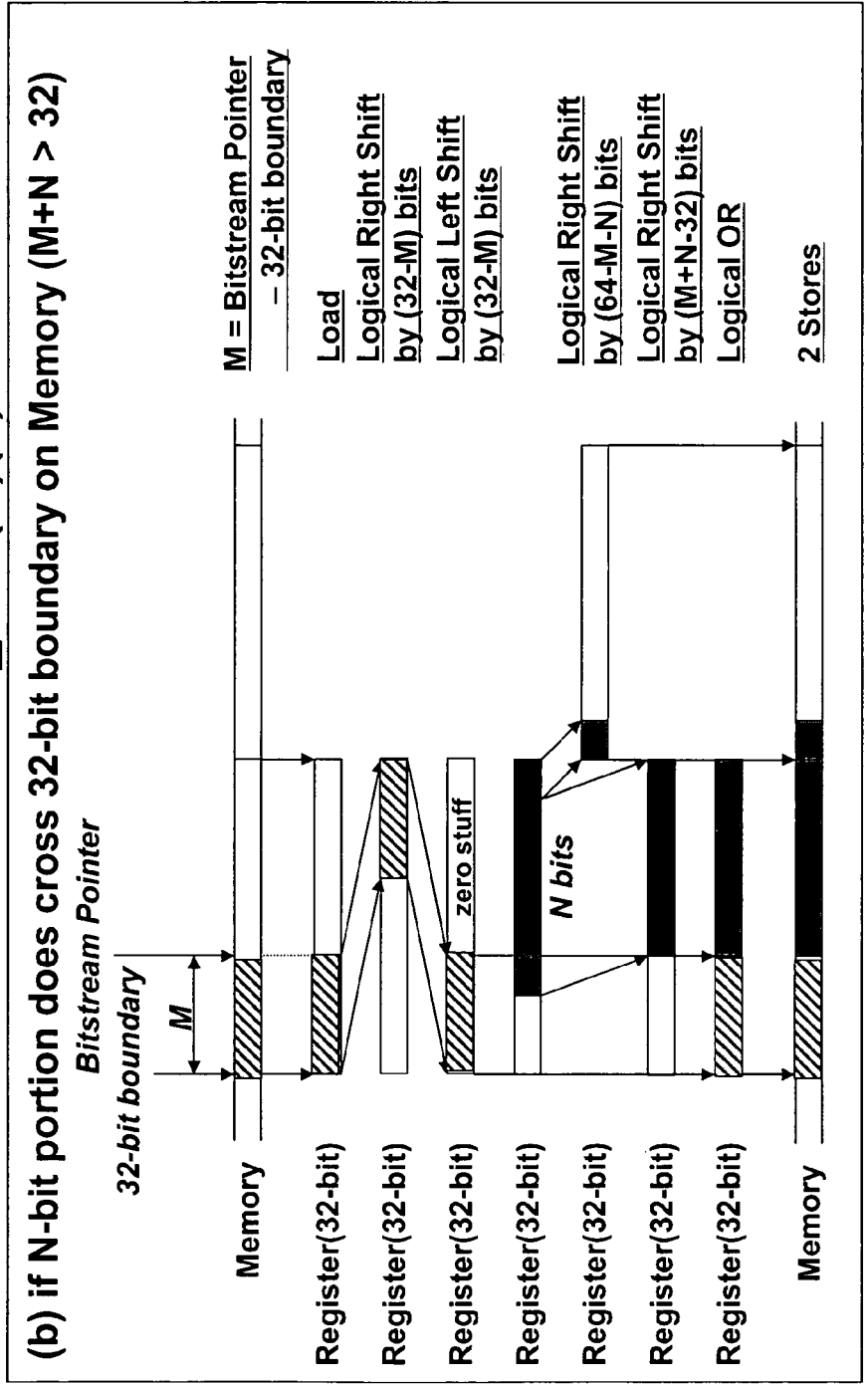
FIG. 6 illustrates another conventional bit manipulation function.
Figure 7:
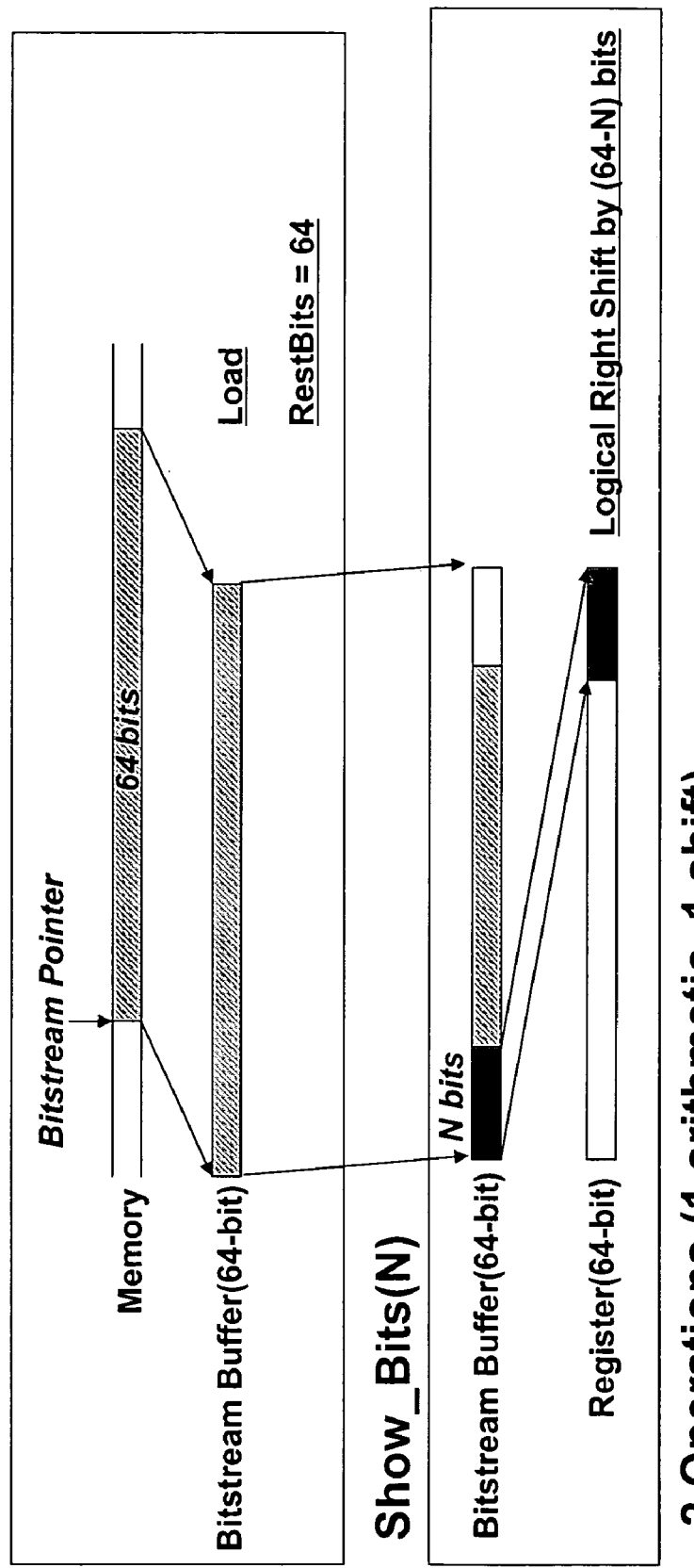
FIG. 7 illustrates a bit manipulation function in accordance with one aspect of the present invention.

FIG. 7 is a diagram illustrating a Show_Bits(N) method according to the invention. Initially, the bitstream of interest is loaded from memory into a register, which acts as a buffer to hold the relevant bitstream, with the leftmost bit being occupied by the leftmost bit of the memory location to which the bitstream pointer points. This register can be designated as a buffer since it holds data reflective of the bitstream. Preferably, the buffer holds greater than 32 bits of data, and the diagram in FIG. 7 shows this buffer to be 64 bits. According to the Show_Bits(N) method of the invention, loading the 64 bits into the 64-bit buffer requires one register load operation. The term RestBits as used herein describes the number of valid bits in the buffer. For instance, loading a 64 bit buffer will result in RestBits being 64. Alternatively, loading a 33 bit buffer will result in RestBits being 33.

After loading the buffer with data, in order to show the N bits of data, the buffer is logically right shifted by the number of bits in the buffer minus the number of bits to be shown, or rather N. Showing N bits from a 64-bit buffer requires that this register be logically right shifted by 64−N bits. Consequently, Show_Bits(N) according to the invention only requires 2 operations: 1 arithmetic and 1 shift. Note that the result of the logical right shift is shown in a 64-bit register not specifically designated as the buffer. This designation was dropped from the register since after register operations have taken place, it technically is no longer reflective of the bitstream.

Figure 8:
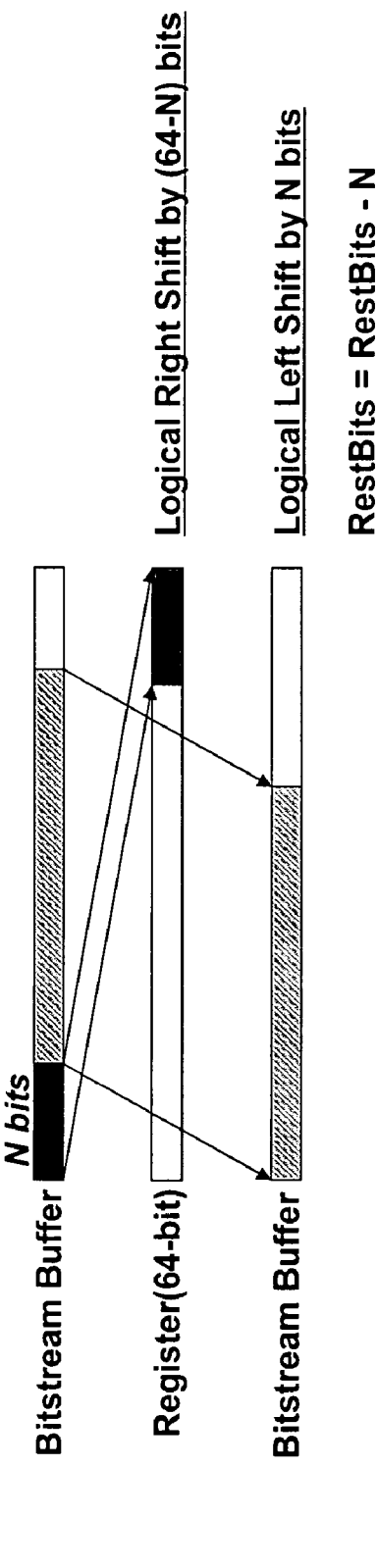
FIG. 8 illustrates a bit manipulation function in accordance with one aspect of the present invention for the case where the number of valid bits in the bitstream is greater than 32+N.

FIG. 8 illustrates a diagram showing a Get_Bits(N) method according to the invention for the case where the number of valid bits in the bitstream, RestBits, is greater than 32+N. The example illustrated in FIG. 8 was a 64-bit buffer. After the contents of the bitstream portion of interest are loaded into the buffer, this register is right shifted by the bit length of the register minus N bits. Consequently, for a 64-bit buffer, the buffer contents will be logically right-shifted by 64−N bits as is shown in FIG. 8. Note that the result of the logical right-shift is shown in a 64-bit register not specifically designated as the buffer. This designation was dropped from the register since after register operations have taken place, it technically is no longer reflective of the Bitstream. The Bitstream pointer is then advanced past the N bits by logically left shifting it to another address past that including the N bits. Since the bitstream pointer has been forwarded past the N bits, the 64-bit register is now reflective again of the bitstream and it is designated as the buffer in FIG. 8. The RestBits value is updated to reflect that the buffer no longer points to the N bits. Consequently RestBits is updated by RestBits−N. This method requires a minimum of 7 operations: 3 arithmetic including (for the example illustrated) 32+N, 64−N and RestBits−N; 1 compare, 2 shift including the buffer shift and the bitstream pointer shift; and 1 branch to the appropriate Get_Bits(N) routine after verifying that RestBits is greater than 32+N.

Figure 9:
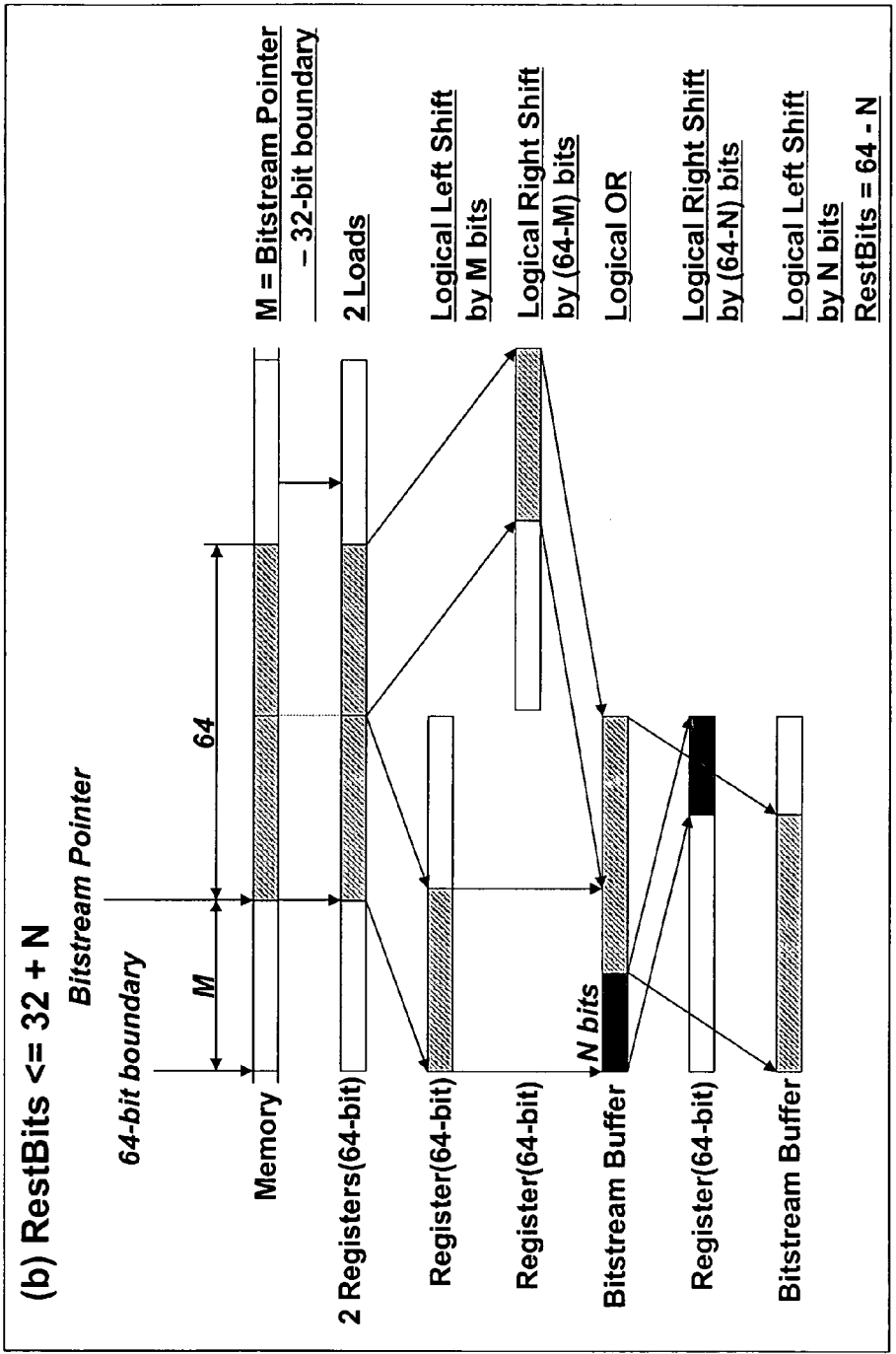
FIG. 9 illustrates a bit manipulation function in accordance with one aspect of the present invention for the case where the number of valid bits in the bitstream is less than 32−N.

FIG. 9 illustrates a diagram showing a Get_Bits(N) method according to the invention for the case where RestBits is less than 32−N. Contents of the relevant portion of memory are loaded into two registers. For example, FIG. 9 illustrates an example using two 64-bit registers. The least significant half of the register holding the most significant bit information is logically left-shifted by M bits, M being the number of bits from the 64-bit boundary. The other 64-bit register is logically right-shifted by the bit capacity of the register minus M bits or rather 64−M bits. The contents of the two registers are then logically summed (e.g., logically OR'ed) with the result being stored in the buffer. The buffer is logically right-shifted by the bit capacity of the register minus N, or 64−N for the example shown in FIG. 9. Next, the bitstream pointer is logically left shifted by N bits so that the N bits are no longer being pointed to. The RestBits value is updated to reflect the number of bits in the register minus N, or 64−N for the example shown in FIG. 9.

Figure 10:
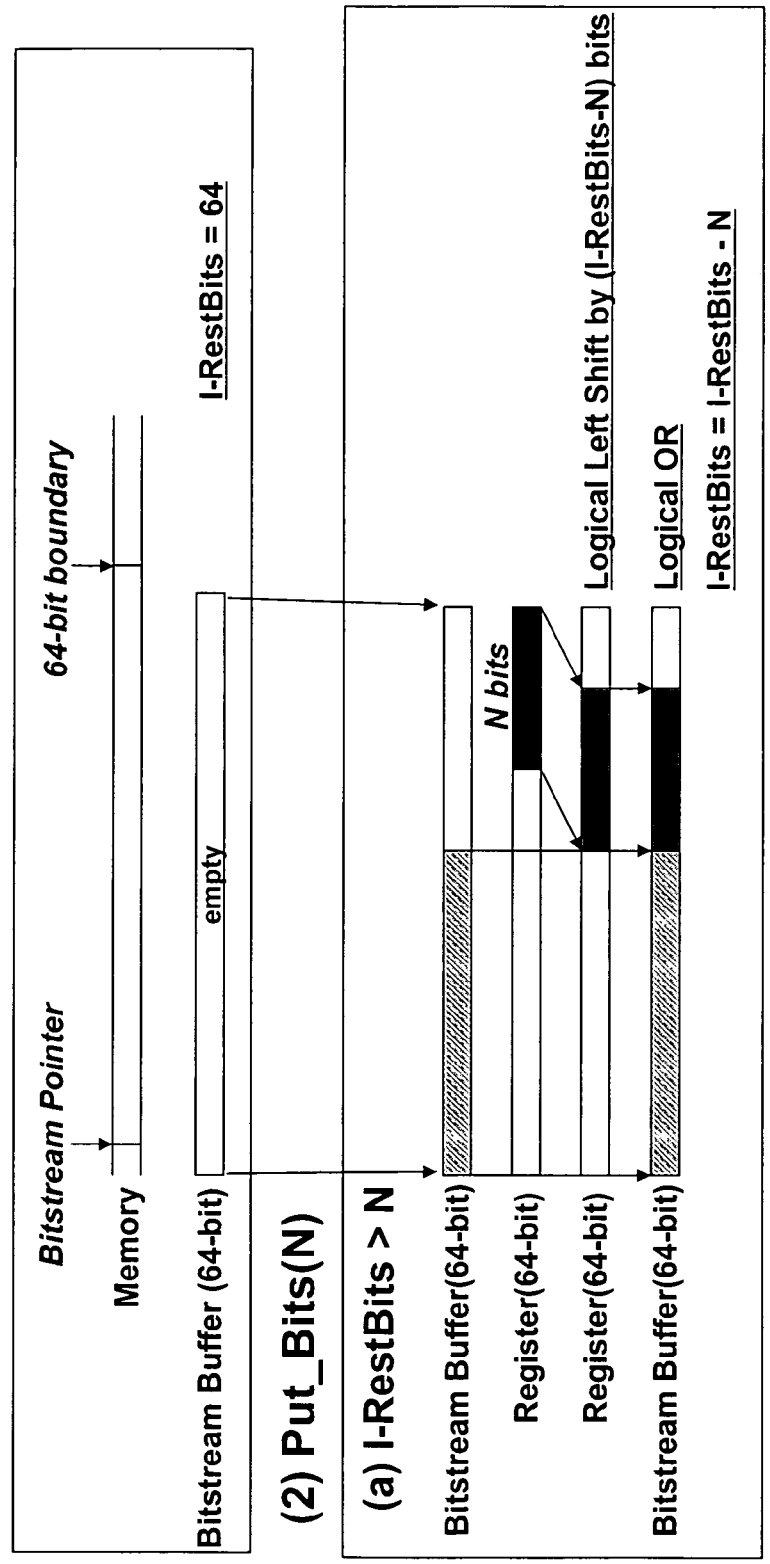
FIG. 10 illustrates a bit manipulation function in accordance with one aspect of the present invention for the case when the number of invalid bits in the buffer is greater than N.

FIG. 10 illustrates a diagram showing a Put_Bits(N) method according to the invention when the number of invalid bits in the buffer is greater than N. The number of invalid bits in the buffer shall be referred to as I-Restbits. Starting with an empty buffer of say 64 bits, the N bits to be placed in the buffer are stored in a 64-bit register. This register is logically left shifted by I-Restbits minus N and the result is logically summed (e.g., logically OR'ed) with the buffer so as to place the N bits in the buffer. I-RestBits becomes I-RestBits-N. This Put_Bits(N) method requires 5 operations: 1 arithmetic, 1 logical, 1 compare, 1 shift and 1 branch to the appropriate Put_Bits(N) routine based on the result of I-RestBits being greater than N.

Figure 11:
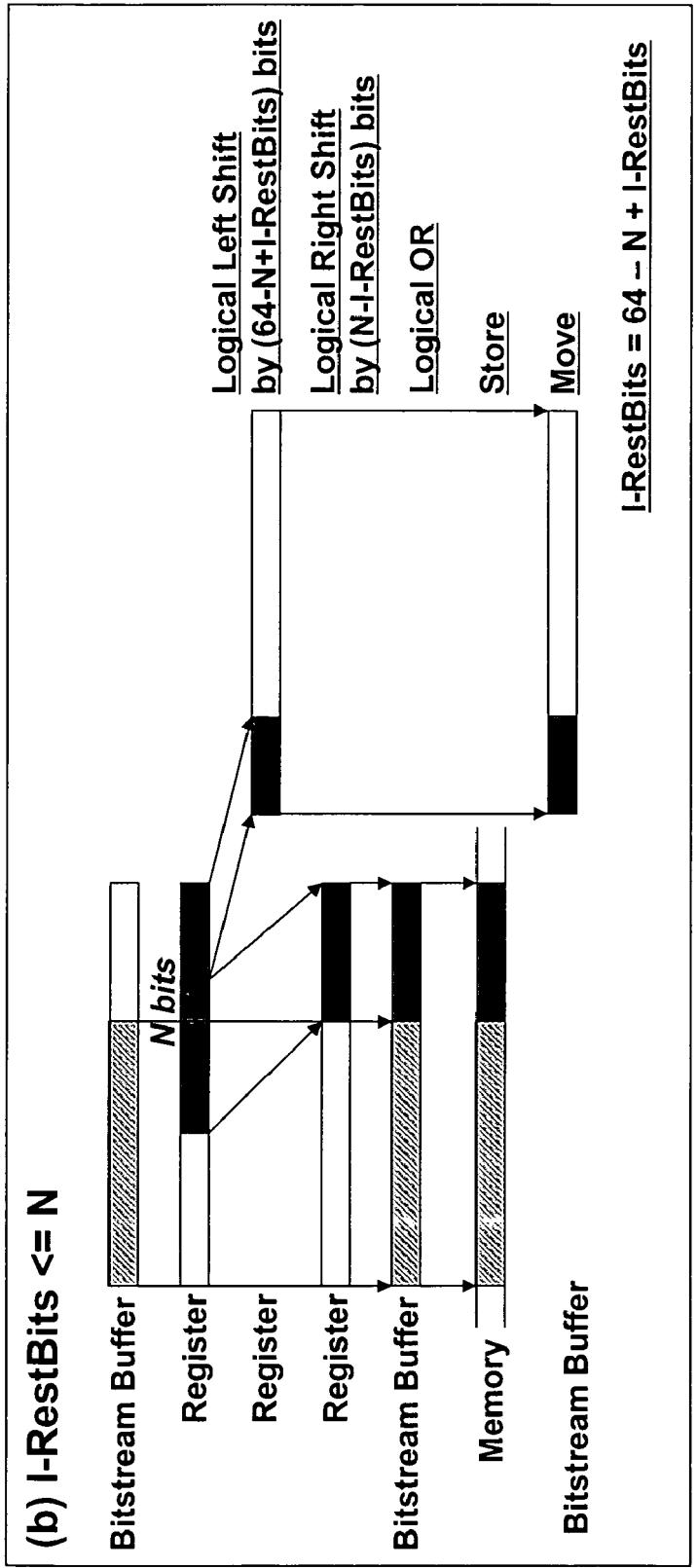
FIG. 11 illustrates a bit manipulation function in accordance with one aspect of the present invention for the case when the number of invalid bits is less than N.

FIG. 11 illustrates a diagram showing a Put_Bits (N) method when the number of invalid bits, I-Restbits, is less than N. The buffer is initially empty. N bits in a register, of a size greater than 32 bits, e.g., 64 bits is logically right-shifted by (64−N+I-RestBits). The shifted out data is placed in a separate 64 bit register which is logically left-shifted by 64−I+RestBits. The register in which right-shift occurred is logically summed (e.g., logically OR'ed) with the contents of the buffer. In this case, the buffer has (64-RestBits) of valid bits. Since N is larger than RestBits, N bits is separated into two parts and the following steps are followed. First, the left portion of N bits is stored into a register in order to merge it with the contents of the buffer. Second, the right portion of N bits is stored temporarily into a second register. After putting the first register's value into the buffer, the contents of the buffer is placed into memory since the buffer is full. After this operation, the second register's content is stored into the buffer and RestBits are re-initialized.

Figure 12:
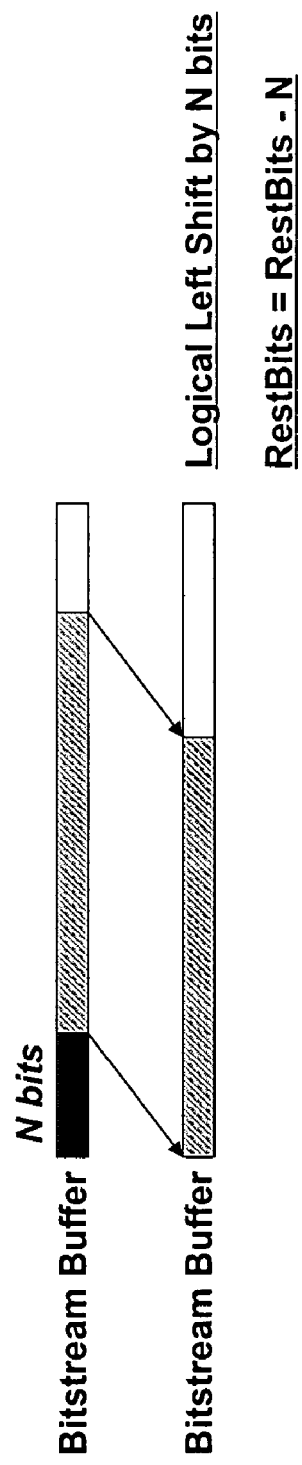
FIG. 12 illustrates a bit manipulation function in accordance with one aspect of the present invention for the case when the number of valid bits in the bitstream is greater than 32+N.

FIG. 12 illustrates a diagram showing a Delete_Bits(N) method for the condition where RestBits is greater than 32+N, and this assumes that RestBits is always greater than 32. The buffer is logically left shifted by N bits to reflect the deletion of the N bits from the bitstream. This requires 5 operations: 2 arithmetic, 1 shift, 1 condition and 1 branch to the appropriate delete bits routine.

Figure 13:
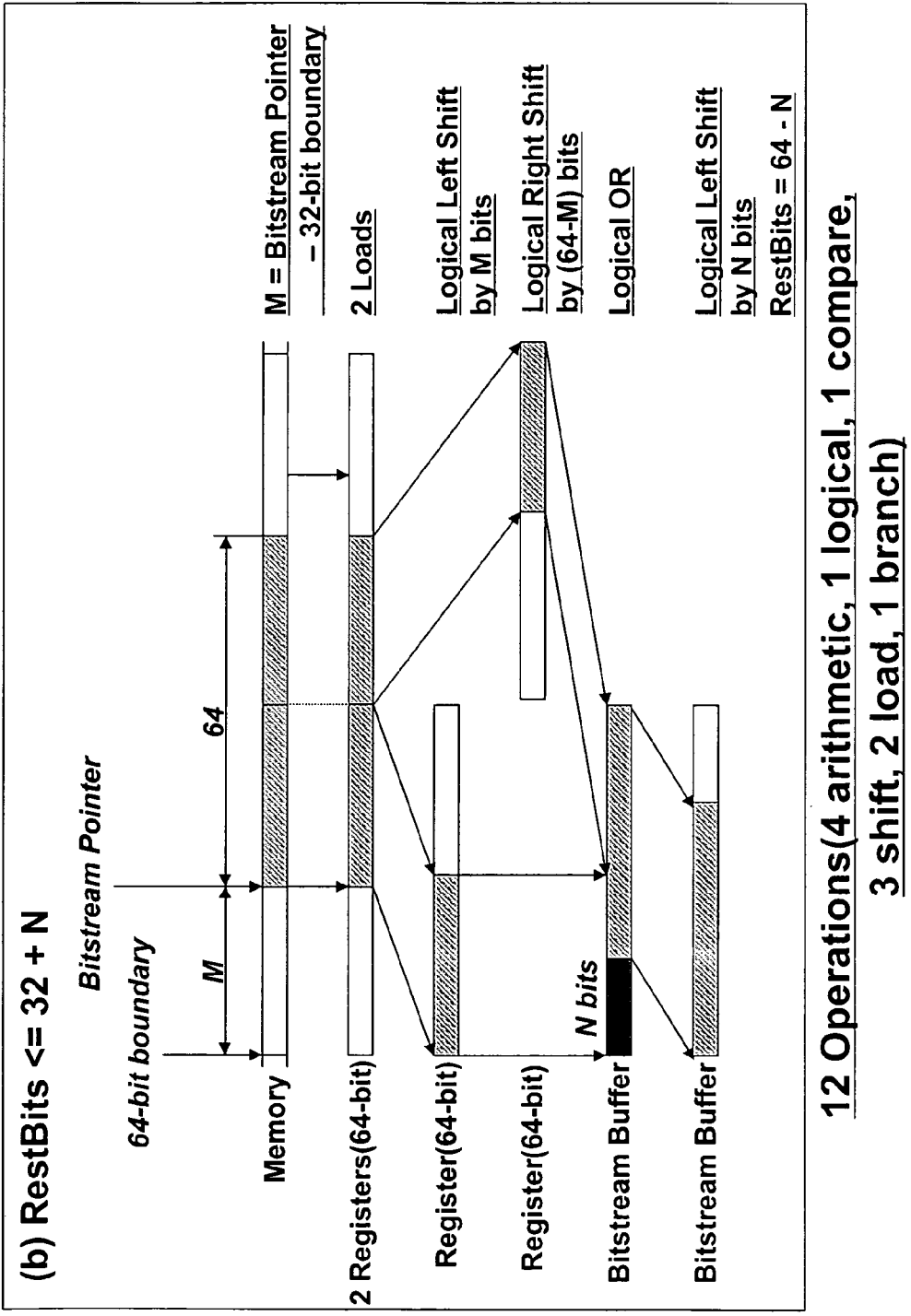
FIG. 13 illustrates a bit manipulation function in accordance with one aspect of the present invention for the case where "RestBits" is less than 32+N.

FIG. 13 illustrates a Delete_Bits(N) method with the buffer register for the case where RestBits is less than 32+N. The example shown in FIG. 13 illustrates Delete_Bits (N) using 64-bit registers. The bitstream pointer points to an address in memory wherein the last bit of the memory contents is M bits away from a 32-bit boundary. The contents of memory which includes the N bits to be deleted from the buffer is loaded into two 64-bit registers. The register containing the bits included in the memory location being addressed by the bitstream pointer is logically left-shifted by M bits. The other 64-bit register is right-shifted by 64−M bits. The two 64-bit registers are logically summed (e.g., logically OR'ed) in the buffer. The bitstream pointer is advanced to an address which does not include the N bits to be deleted. This Delete_Bits(N) method requires 12 operations: 4 arithmetic, 1 logical OR, 1 compare, 3 shift, 2 loads and 1 branch.

The bit manipulation steps in accordance with the various aspects of the present invention can be performed on a wide range of processing systems. For example, the bit manipulation steps can be performed on a stand-alone processing system. They can also be performed on a multi-processor system. An example of a multi-processor system that can be used to perform the bit manipulation steps of the present invention is illustrated in FIG. 14.

Figure 14:
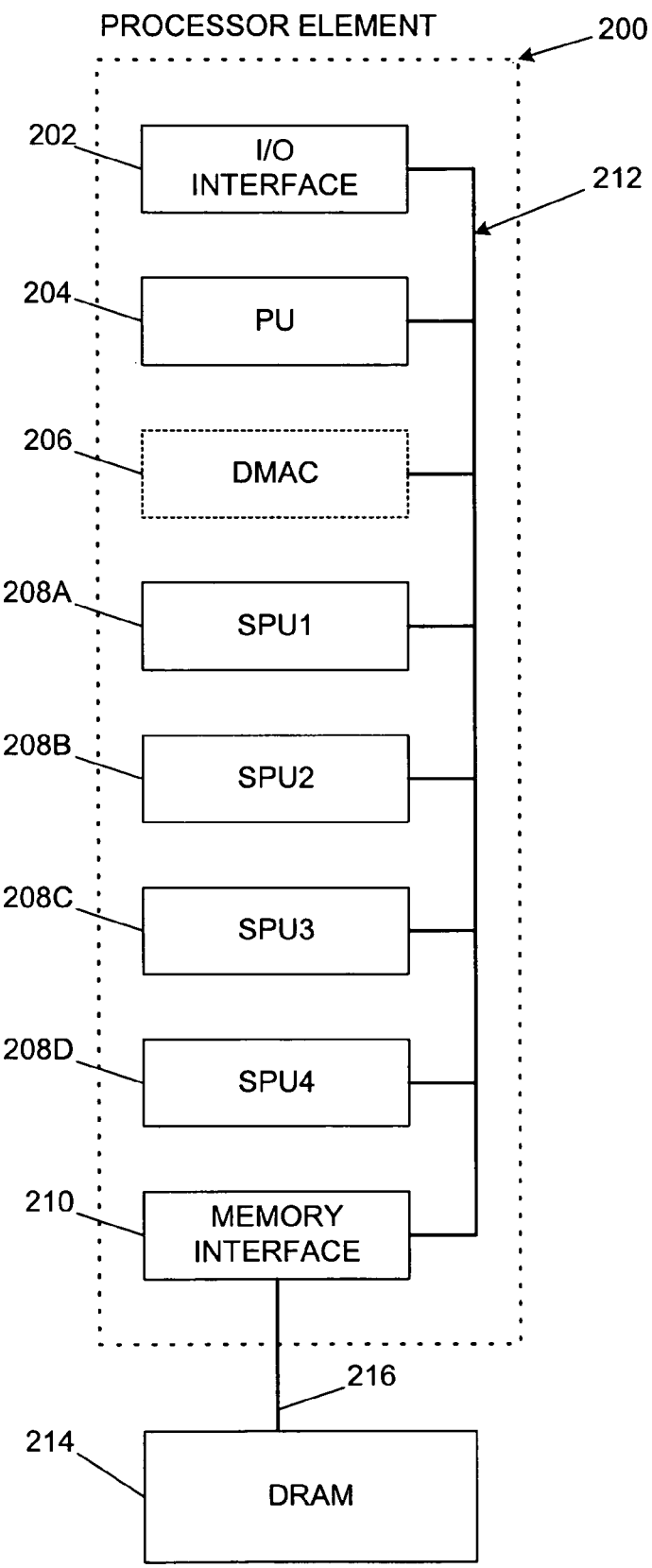
FIGS. 14 and 15 illustrate a block diagram of one processing system that can be used to perform bit manipulation in accordance with the present invention.

FIG. 14 illustrates a processor element. The processor element includes an I/O interface 202, a processor unit 204, a direct memory access controller 206, a plurality of sub-processing units 208, and a memory interface 210. The processor element communicates with a DRAM 214. The processor element is more fully described in U.S. patent application Ser. Nos. 09/816,004 and 09/816,020, both filed on Mar. 22, 2001, which are hereby incorporated by reference.

Figure 15:
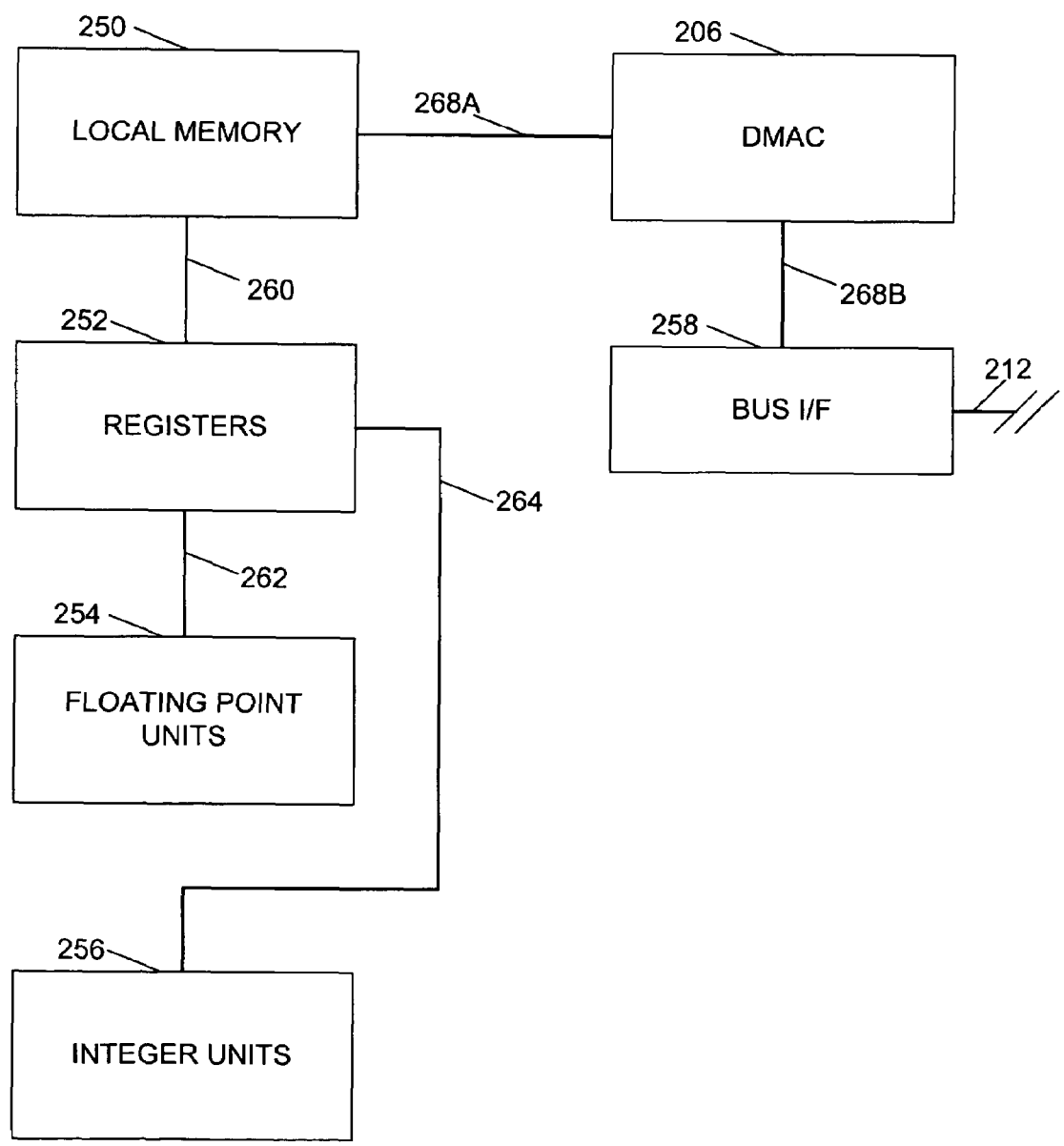

FIG. 15 illustrates an exemplary sub-processing unit 208. Each sub-processing unit includes local memory 250, registers 252, floating point units 254, integer units 256, and a bus interface 258. The bit manipulation processing in accordance with the various aspects of the present invention can be performed in a number of different places in the processor element of FIG. 14. For instance, it can be performed in the processor unit 204. The bit manipulation of the present invention can also be performed in any of the sub-processing units. Further, processor systems having multiple processors are contemplated by the present invention, and the bit manipulation of the present invention can be performed in selected processor elements in a system having multiple processor elements.

Figure 16:
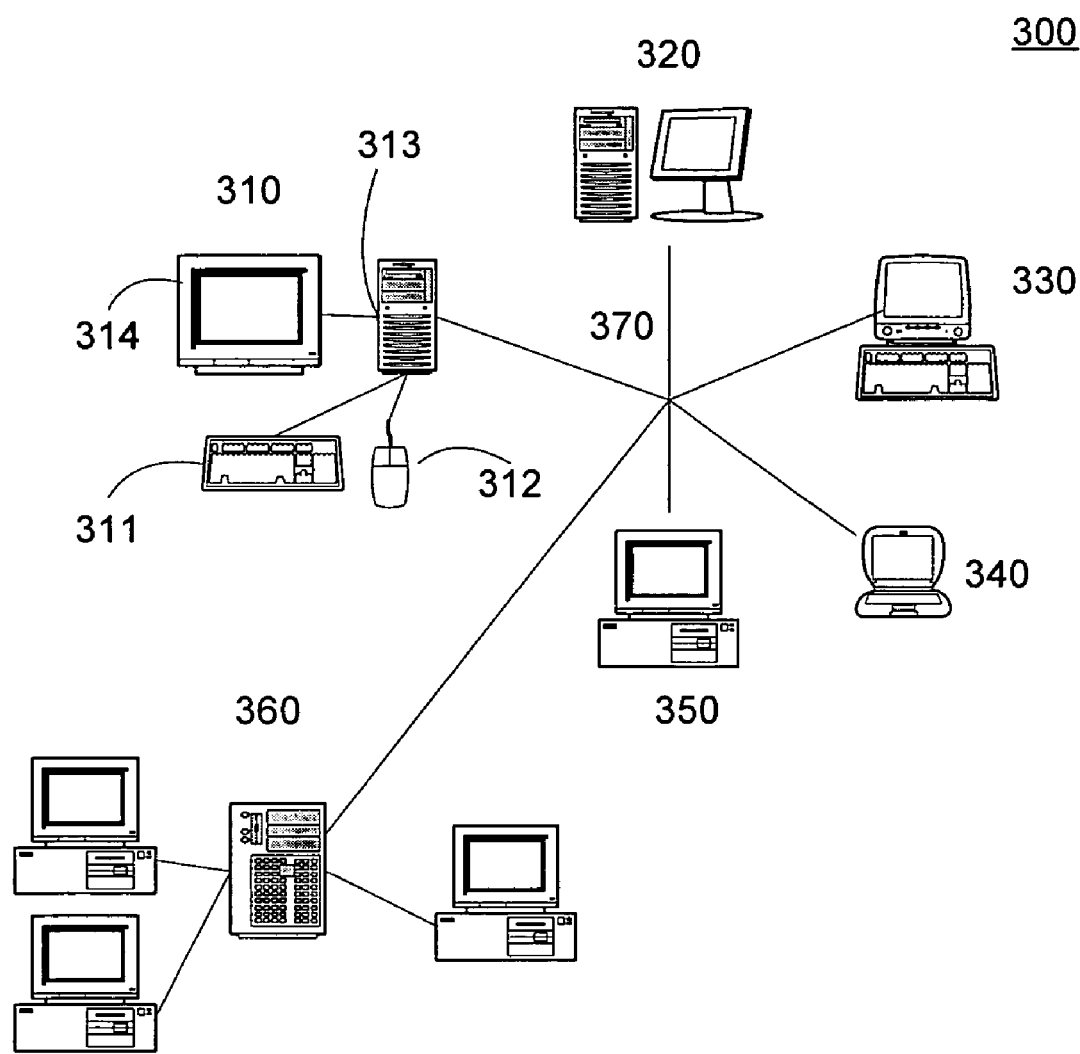
FIG. 16 is a schematic diagram of a computer network depicting various computing devices that can be used in accordance with the present invention.

FIG. 16 is a schematic diagram of a computer network depicting various computing devices that can be used alone or in a networked configuration in accordance with the present invention. The computing devices may comprise computer-type devices employing various types of user inputs, displays, memories and processors such as found in typical PCs, laptops, servers, gaming consoles, PDAs, etc. For example, FIG. 16 illustrates a computer network 300 that has a plurality of computer processing systems 310, 320, 330, 340, 350 and 360, connected via a communications network 370 such as a LAN, WAN, the Internet, etc. and which can be wired, wireless, a combination, etc.

Each computer processing system can include, for example, one or more computing devices having user inputs such as a keyboard 311 and mouse 312 (and various other types of known input devices such as pen-inputs, joysticks, buttons, touch screens, etc.), a display interface 313 (such as connector, port, card, etc.) for connection to a display 314, which could include, for instance, a CRT, LCD, or plasma screen monitor, TV, projector, etc. Each computer also preferably includes the normal processing components found in such devices such as one or more memories and one or more processors located within the computer processing system. The memories and processors within such computing device are adapted to perform the bit manipulations on data in a bitstream in accordance with the various aspects of the present invention as described herein. The memories can include memories for storing bitstream data, buffer memories for receiving data transfers from the bitstream data and memories for storing instructions for causing a processor to perform the storage, transfers and bitstream manipulations in accordance with the present invention.

The present invention is substantially more efficient than conventional processing of variable bitstreams in most cases. The larger the registers, the more efficient the process becomes. The registers and bitstream buffers should preferably be at least 64 bits, and more preferably, the registers and buffers are 128 bits or more.

Although the invention herein has been described with reference to particular embodiments, it is to be understood that these embodiments are merely illustrative of the principles and applications of the present invention. The foregoing described invention has particular application to audio/video coder-decoders (CODECs) and video games and the like which required fast and repetitive manipulation of data. It is therefore to be understood that numerous modifications may be made to the illustrative embodiments and that other arrangements may be devised without departing from the spirit and scope of the present invention as defined by the appended claims.

The invention claimed is:

1. A method of performing bit manipulation on data in a bitstream that is stored in a memory having an address boundary length, said method comprising:
   (I) transferring the data in the bitstream from the memory into a buffer, the buffer having a bit length greater than the address boundary length of the memory;
   (II) locating a number of valid bits to get in a predetermined alignment in the buffer; and
   (III) when the number of valid bits in the transferred data of the buffer is less than or equal to a register address bit length plus the number of bits to get, manipulating the transferred data while it is stored in the buffer, including:
      (i) loading the contents of the memory containing the bits to get into the buffer and a register, the buffer and the register having a bit length greater than the memory address bit length,
      (ii) logically left-shifting the loaded data stored in the buffer by M bits, wherein M is the number of bits between the buffer boundary and the most significant bit of the address pointed to by a bitstream pointer,
(iii) logically right-shifting the loaded data stored in the register by the difference of the buffer bit length and M,
(iv) logically summing the left-shifted contents of the buffer with the right-shifted contents of the register,
(v) storing the logical sum in the buffer,
(vi) logically right-shifting the logical sum in the buffer by the bit capacity of the buffer minus the number of bits to get, and
(vii) shifting the bitstream pointer past the memory address holding the number of bits to get.

2. The method as recited in claim 1, further comprising:
(IV) when the number of valid bits in the transferred data of the buffer is greater than the bit length of the register plus the number of bits to get, manipulating the bitstream data while it is stored in the buffer, including:
(i) logically right-shifting the transferred data stored in the buffer by the bit length of the buffer minus the number of bits to get, and
(ii) logically shifting the bitstream pointer to a new memory address past an address including the number of bits to get.

3. A method of performing bit manipulation on data in a bitstream that is stored in a memory having an address boundary length, said method comprising:
(I) transferring the data in the bitstream from the memory into a buffer, the buffer having a bit length greater than the address boundary length of the memory; and
(II) when a number of invalid bits in the transferred data of the buffer is greater than the number of bits to be put into the buffer, manipulating the transferred data while it is stored in the buffer, including:
(i) loading the bits to be put into the buffer into a register,
(ii) logically left-shifting the loaded data stored in the register by the number of invalid bits in the buffer minus the number of bits to be put in the buffer,
(iii) logically summing the transferred data of the buffer with the left-shifted contents of the register, and
(iv) storing the logical sum in the buffer.

4. A method of performing bit manipulation on data in a bitstream that is stored in a memory having an address boundary length, said method comprising:
(I) transferring the data in the bitstream from the memory into a buffer, the buffer having a bit length greater than the address boundary length of the memory; and
(II) when a number of invalid bits of transferred data in the buffer is less than or equal to the number of bits to be put into the buffer, manipulating the transferred data while it is stored in the buffer, including:
(i) storing a first part of bits to be put into the buffer into a first register,
(ii) logically right shifting the first part of the bits to be put that are stored in the first register by the number of bits to be put in the buffer minus the number of invalid bits in the buffer,
(iii) logically summing the right shifted contents of the first register with the transferred data of the buffer and putting the results into the memory,
(iv) storing a second part of bits to be put into the buffer into a second register,
(v) logically left shifting the second part of bits to be put that are stored in the second register by the bit length of the buffer minus the number of bits to put into the buffer plus the number of invalid bits in the buffer, and
(vi) storing the left shifted contents of the second register into the buffer.

5. A method of performing bit manipulation on data in a bitstream that is stored in a memory having an address boundary length, said method comprising:
(I) transferring the data in the bitstream from the memory into a buffer, the buffer having a bit length greater than the address boundary length of the memory; and
(II) manipulating the transferred data while it is stored in the buffer to delete a number of bits from the buffer;
wherein when the number of valid bits in the transferred data is greater than the bit length of a register address plus the number of bits to be deleted, said step of manipulating the bitstream data includes:
logically left shifting the transferred data stored in the buffer by the number of bits to be deleted.

6. A method of performing bit manipulation on data in a bitstream that is stored in a memory having an address boundary length, said method comprising:
(I) transferring the data in the bitstream from the memory into a buffer, the buffer having a bit length greater than the address boundary length of the memory; and
(II) manipulating the transferred data while it is stored in the buffer to delete a number of bits from the buffer;
(III) wherein when the number of valid bits in the transferred data is less than or equal to the bit length of a register address plus the number of bits to be deleted, said step of manipulating the transferred data includes:
(i) loading the contents of memory including the bits to be deleted into first and second registers, the first and the second register having a bit length greater than the memory address bit length,
(ii) logically left-shifting the first register by M bits, M being the number of bits between the buffer boundary and the most significant bit of the address pointed to by the bitstream pointer,
(iii) logically right-shifting the bit loaded into the second register by the difference of the buffer bit capacity and M,
(iv) logically summing the left-shifted contents of the first register with the right-shifted contents of the second register, and
(v) storing the logical sum in the buffer.

7. A processor having instructions for carrying out a method of performing bit manipulation on data in a bitstream that is stored in a memory having an address boundary length, said method comprising:
(I) transferring the data in the bitstream from the memory into a buffer, the buffer having a bit length greater than the address boundary length of the memory;
(II) locating a number of valid bits to get in a predetermined alignment in the buffer; and
(III) when the number of valid transferred bits in the buffer is less than or equal to a register address bit length plus the number of bits to get, manipulating the transferred bit data while it is stored in the buffer, including:
(i) loading the contents of the memory containing the bits to get into the buffer and a register, the buffer and the register having a bit length greater than the memory address bit length,
(ii) logically left-shifting the loaded data stored in the buffer by M bits, wherein M is the number of bits between the buffer boundary and the most significant bit of the address pointed to by a bitstream pointer,
(iii) logically right-shifting the loaded data stored in the register by the difference of the buffer bit length and M,
(iv) logically summing the left-shifted contents of the buffer with the right-shifted contents of the registers,
(v) storing the logical sum in the buffer,
(vi) logically right-shifting the logical sum in the buffer by the bit capacity of the buffer minus the number of bits to get, and
(vii) shifting the bitstream pointer past the memory address holding the number of bits to get.

8. A processor having instructions for carrying out a method of performing bit manipulation on data in a bitstream that is stored in a memory having an address boundary length, said method comprising:
(I) transferring the data in the bitstream from the memory into a buffer, the buffer having a bit length greater than the address boundary length of the memory; and
(II) when a number of invalid bits in the transferred data of the buffer is greater than the number of bits to be put into the buffer, manipulating the transferred data while it is stored in the buffer, including:
(i) loading the bits to be put into the buffer into a register,
(ii) logically left-shifting the loaded data stored in the register by the number of invalid bits in the buffer minus the number of bits to be put in the buffer,
(iii) logically summing the transferred data of the buffer with the left-shifted contents of the register, and
(iv) storing the logical sum in the buffer.

9. A processor having instructions for carrying out a method of performing bit manipulation on data in a bitstream that is stored in a memory having an address boundary length, said method comprising:
(I) transferring the data in the bitstream from the memory into a buffer, the buffer having a bit length greater than the address boundary length of the memory; and
(II) manipulating the transferred data while it is stored in the buffer to delete a number of bits from the buffer;
wherein when the number of valid bits in the transferred data is greater than the bit length of a register address plus the number of bits to be deleted, said step of manipulating the bitstream data includes:
logically left shifting the transferred data stored in the buffer by the number of bits to be deleted.

10. A computer-readable medium storing instructions for a processor to carry out a method of performing bit manipulation on data in a bitstream that is stored in a memory having an address boundary length, said method comprising:
(I) transferring the data in the bitstream from the memory into a buffer, the buffer having a bit length greater than the address boundary length of the memory;
(II) locating a number of valid bits to get in a predetermined alignment in the buffer; and
(III) when the number of valid bits in the transferred data of the buffer is less than or equal to a register address bit length plus the number of bits to get, manipulating the transferred data while it is stored in the buffer, including:
(i) loading the contents of the memory containing the bits to get into the buffer and a register, the buffer and the register having a bit length greater than the memory address bit length,
(ii) logically left-shifting the loaded data stored in the buffer by M bits, wherein M is the number of bits between the buffer boundary and the most significant bit of the address pointed to by a bitstream pointer,
(iii) logically right-shifting the loaded data stored in the register by the difference of the buffer bit length and M,
(iv) logically summing the left-shifted contents of the buffer with the right-shifted contents of the register,
(v) storing the logical sum in the buffer,
(vi) logically right-shifting the logical sum in the buffer by the bit capacity of the buffer minus the number of bits to get, and
(vii) shifting the bitstream pointer past the memory address holding the number of bits to get.

11. A system, comprising:
a memory operable to store data in a bitstream and having an address boundary length; and
a processor that includes a buffer having a bit length greater than the address boundary length of the memory, said processor having instructions for carrying out a method of performing bit manipulation on data in a bitstream that is stored in a memory having an address boundary length, said method comprising:
(I) transferring the data in the bitstream from the memory into a buffer, the buffer having a bit length greater than the address boundary length of the memory;
(II) locating a number of valid bits to get in a predetermined alignment in the buffer; and
(III) when the number of valid bits in the transferred data of the buffer is less than or equal to a register address bit length plus the number of bits to get, manipulating the transferred data while it is stored in the buffer, including:
(i) loading the contents of the memory containing the bits to get into the buffer and a register, the buffer and the register having a bit length greater than the memory address bit length,
(ii) logically left-shifting the loaded data stored in the buffer by M bits, wherein M is the number of bits between the buffer boundary and the most significant bit of the address pointed to by a bitstream pointer,
(iii) logically right-shifting the loaded data stored in the register by the difference of the buffer bit length and M,
(iv) logically summing the left-shifted contents of the buffer with the right-shifted contents of the register,
(v) storing the logical sum in the buffer,
(vi) logically right-shifting the logical sum in the buffer by the bit capacity of the buffer minus the number of bits to get, and
(vii) shifting the bitstream pointer past the memory address holding the number of bits to get.

12. A system as claimed in claim 11, wherein the memory and processor are integrated on a single chip.

13. A system as claimed in claim 11, wherein the memory and processor are separately provided.

14. A processor having instructions for carrying out a method of performing bit manipulation on data in a bitstream that is stored in a memory having an address boundary length, said method comprising:
(I) transferring the data in the bitstream from the memory into a buffer, the buffer having a bit length greater than the address boundary length of the memory; and
(II) when a number of invalid bits of transferred data in the buffer is less than or equal to the number of bits to be put into the buffer, manipulating the transferred data while it is stored in the buffer, including:
(i) storing a first part of bits to be put into the buffer into a first register,
(ii) logically right shifting the first part of the bits to be put that are stored in the first register by the number of bits to be put in the buffer minus the number of invalid bits in the buffer,
(iii) logically summing the right shifted contents of the first register with the transferred data of the buffer and putting the results into the memory,
(iv) storing a second part of bits to be put into the buffer into a second register,
(v) logically left shifting the second part of bits to be put that are stored in the second register by the bit length of the buffer minus the number of bits to put into the buffer plus the number of invalid bits in the buffer, and
(vi) storing the left shifted contents of the second register into the buffer.

15. A processor having instructions for carrying out a method of performing bit manipulation on data in a bitstream that is stored in a memory having an address boundary length, said method comprising:
(I) transferring the data in the bitstream from the memory into a buffer, the buffer having a bit length greater than the address boundary length of the memory; and
(II) manipulating the transferred data while it is stored in the buffer to delete a number of bits from the buffer;
(III) wherein when the number of valid bits in the transferred data is less than or equal to the bit length of a register address plus the number of bits to be deleted, said step of manipulating the transferred data includes:
(i) loading the contents of memory including the bits to be deleted into first and second registers, the first and the second register having a bit length greater than the memory address bit length,
(ii) logically left-shifting the first register by M bits, M being the number of bits between the buffer boundary and the most significant bit of the address pointed to by the bitstream pointer,
(iii) logically right-shifting the bit loaded into the second register by the difference of the buffer bit capacity and M,
(iv) logically summing the left-shifted contents of the first register with the right-shifted contents of the second register, and
(v) storing the logical sum in the buffer.

16. A computer-readable medium storing instructions for a processor to carry out a method of performing bit manipulation on data in a bitstream that is stored in a memory having an address boundary length, said method comprising:
(I) transferring the data in the bitstream from the memory into a buffer, the buffer having a bit length greater than the address boundary length of the memory; and
(II) when a number of invalid bits in the transferred data of the buffer is greater than the number of bits to be put into the buffer, manipulating the transferred data while it is stored in the buffer, including:
(i) loading the bits to be put into the buffer into a register,
(ii) logically left-shifting the loaded data stored in the register by the number of invalid bits in the buffer minus the number of bits to be put in the buffer,
(iii) logically summing the transferred data of the buffer with the left-shifted contents of the register, and
(iv) storing the logical sum in the buffer.

17. A computer-readable medium storing instructions for a processor to carry out a method of performing bit manipulation on data in a bitstream that is stored in a memory having an address boundary length, said method comprising:
(I) transferring the data in the bitstream from the memory into a buffer, the buffer having a bit length greater than the address boundary length of the memory; and
(II) when a number of invalid bits of transferred data in the buffer is less than or equal to the number of bits to be put into the buffer, manipulating the transferred data while it is stored in the buffer, including:
(i) storing a first part of bits to be put into the buffer into a first register,
(ii) logically right shifting the first part of the bits to be put that are stored in the first register by the number of bits to be put in the buffer minus the number of invalid bits in the buffer,
(iii) logically summing the right shifted contents of the first register with the transferred data of the buffer and putting the results into the memory,
(iv) storing a second part of bits to be put into the buffer into a second register,
(v) logically left shifting the second part of bits to be put that are stored in the second register by the bit length of the buffer minus the number of bits to put into the buffer plus the number of invalid bits in the buffer, and
(vi) storing the left shifted contents of the second register into the buffer.

18. A computer-readable medium storing instructions for a processor to carry out a method of performing bit manipulation on data in a bitstream that is stored in a memory having an address boundary length, said method comprising:
(I) transferring the data in the bitstream from the memory into a buffer, the buffer having a bit length greater than the address boundary length of the memory; and
(II) manipulating the transferred data while it is stored in the buffer to delete a number of bits from the buffer;
wherein when the number of valid bits in the transferred data is greater than the bit length of a register address plus the number of bits to be deleted, said step of manipulating the bitstream data includes:
logically left shifting the transferred data stored in the buffer by the number of bits to be deleted.

19. A computer-readable medium storing instructions for a processor to carry out a method of performing bit manipulation on data in a bitstream that is stored in a memory having an address boundary length, said method comprising:
(I) transferring the data in the bitstream from the memory into a buffer, the buffer having a bit length greater than the address boundary length of the memory; and
(II) manipulating the transferred data while it is stored in the buffer to delete a number of bits from the buffer;
(III) wherein when the number of valid bits in the transferred data is less than or equal to the bit length of a register address plus the number of bits to be deleted, said step of manipulating the transferred data includes:
(i) loading the contents of memory including the bits to be deleted into first and second registers, the first and the second register having a bit length greater than the memory address bit length,
(ii) logically left-shifting the first register by M bits, M being the number of bits between the buffer boundary and the most significant bit of the address pointed to by the bitstream pointer, (iii) logically right-shifting the bit loaded into the second register by the difference of the buffer bit capacity and M, (iv) logically summing the left-shifted contents of the first register with the right-shifted contents of the second register, and (v) storing the logical sum in the buffer.

20. A system, comprising:

a memory operable to store data in a bitstream and having an address boundary length; and a processor that includes a buffer having a bit length greater than the address boundary length of the memory, said processor having instructions for carrying out a method of performing bit manipulation on data in a bitstream that is stored in a memory having an address boundary length, said method comprising:

(I) transferring the data in the bitstream from the memory into a buffer, the buffer having a bit length greater than the address boundary length of the memory; and (II) when a number of invalid bits in the transferred data of the buffer is greater than the number of bits to be put into the buffer, manipulating the transferred data while it is stored in the buffer, including:

(i) loading the bits to be put into the buffer into a register, (ii) logically left-shifting the loaded data stored in the register by the number of invalid bits in the buffer minus the number of bits to be put in the buffer, (iii) logically summing the transferred data of the buffer with the left-shifted contents of the register, and (iv) storing the logical sum in the buffer.

21. A system, comprising:

a memory operable to store data in a bitstream and having an address boundary length; and a processor that includes a buffer having a bit length greater than the address boundary length of the memory, said processor having instructions for carrying out a method of performing bit manipulation on data in a bitstream that is stored in a memory having an address boundary length, said method comprising:

(I) transferring the data in the bitstream from the memory into a buffer, the buffer having a bit length greater than the address boundary length of the memory; and (II) when a number of invalid bits of transferred data in the buffer is less than or equal to the number of bits to be put into the buffer, manipulating the transferred data while it is stored in the buffer, including:

(i) storing a first part of bits to be put into the buffer into a first register, (ii) logically right shifting the first part of the bits to be put that are stored in the first register by the number of bits to be put in the buffer minus the number of invalid bits in the buffer, (iii) logically summing the right shifted contents of the first register with the transferred data of the buffer and putting the results into the memory, (iv) storing a second part of bits to be put into the buffer into a second register, (v) logically left shifting the second part of bits to be put that are stored in the second register by the bit length of the buffer minus the number of bits to put into the buffer plus the number of invalid bits in the buffer, and (vi) storing the left shifted contents of the second register into the buffer.

22. A system, comprising:

a memory operable to store data in a bitstream and having an address boundary length; and a processor that includes a buffer having a bit length greater than the address boundary length of the memory, said processor having instructions for carrying out a method of performing bit manipulation on data in a bitstream that is stored in a memory having an address boundary length, said method comprising:

(I) transferring the data in the bitstream from the memory into a buffer, the buffer having a bit length greater than the address boundary length of the memory; and (II) manipulating the transferred data while it is stored in the buffer to delete a number of bits from the buffer;

wherein when the number of valid bits in the transferred data is greater than the bit length of a register address plus the number of bits to be deleted, said step of manipulating the bitstream data includes:

logically left shifting the transferred data stored in the buffer by the number of bits to be deleted.

23. A system, comprising:

a memory operable to store data in a bitstream and having an address boundary length; and a processor that includes a buffer having a bit length greater than the address boundary length of the memory, said processor having instructions for carrying out a method of performing bit manipulation on data in a bitstream that is stored in a memory having an address boundary length, said method comprising:

(I) transferring the data in the bitstream from the memory into a buffer, the buffer having a bit length greater than the address boundary length of the memory; and (II) manipulating the transferred data while it is stored in the buffer to delete a number of bits from the buffer;

(III) wherein when the number of valid bits in the transferred data is less than or equal to the bit length of a register address plus the number of bits to be deleted, said step of manipulating the transferred data includes:

(i) loading the contents of memory including the bits to be deleted into first and second registers, the first and the second register having a bit length greater than the memory address bit length, (ii) logically left-shifting the first register by M bits, M being the number of bits between the buffer boundary and the most significant bit of the address pointed to by the bitstream pointer, (iii) logically right-shifting the bit loaded into the second register by the difference of the buffer bit capacity and M, (iv) logically summing the left-shifted contents of the first register with the right-shifted contents of the second register, and (v) storing the logical sum in the buffer.

* * * * *